US006987676B2

(12) United States Patent
Cheng et al.

(10) Patent No.: US 6,987,676 B2
(45) Date of Patent: Jan. 17, 2006

(54) POWER CONVERTER WITH POWER FACTOR ADJUSTING MEANS

(75) Inventors: Ki-Wai David Cheng, New Territories (HK); Yim-Shu Lee, New Territories (HK); Dah-Chuan Dylan Lu, Kowloon (HK)

(73) Assignee: The Hong Kong Polytechnic University, Kowloon (HK)

( * ) Notice: Subject to any disclaimer, the term of this patent is extended or adjusted under 35 U.S.C. 154(b) by 0 days.

(21) Appl. No.: 10/704,623

(22) Filed: Nov. 12, 2003

(65) Prior Publication Data

US 2005/0099828 A1 May 12, 2005

(51) Int. Cl.
*H02M 3/335* (2006.01)

(52) U.S. Cl. .................................... 363/21.12; 323/207

(58) Field of Classification Search ............ 363/21.12, 363/40; 323/207, 209, 210
See application file for complete search history.

(56) References Cited

U.S. PATENT DOCUMENTS

| | | | | |
|---|---|---|---|---|
| 5,991,172 A * | 11/1999 | Jovanovic et al. | ....... | 363/21.14 |
| 6,038,146 A * | 3/2000 | Luo et al. | ................ | 363/21.16 |
| 6,751,104 B2 * | 6/2004 | Qiao et al. | ............... | 363/21.16 |

OTHER PUBLICATIONS

M. Madigan, R. Erickson, and E. Ismail, "Integrated High Quality Rectifier Regulators," IEEE Transaction On Industrial Electronics, vol. 46, No. 4, Aug. 1999, pp. 749-758.

R. Redl, L. Balogh, and N. O. Sokal, "A New Family of Single Stage Isolated Power Factor Correctors with Fast Regulation of the Output Voltage,"0 in IEEE Power Electronics specialists Conf., 1994, pp. 1137-1144.

L. Huber and M. M. Jovanocić, Single-Stage, Single-Switch, Isolated Power Supply Technique with Input-Current Shaping and Fast Output-Voltage Regulation for Universal Input-Voltage-Range Applications, IEEE, 1997 pp. 272-280.

H. Wei, I. Batarseh, G. Zhu, and P. Kometzy, "A Single-Switch AC-DC Converter with Power Factor Correction," in IEEE Trans. Power Electron., vol. 15, No. 3, pp. 421-430, May. 2000.

Y. Jiang, and F. C. Lee, "Single-Stage Single-Phase Parallel Power Factor Correction Shame," in IEEE Applied Power Electronics Conf., 1994, pp. 1145-1151.

O. Garcia, J. A. Cobos, P. Alou, R. Prieto, and J. Uceda, "A Simple-Switch Single-Stage AC/DC Converter with Fast Output Voltage Regulation," in IEEE Power Electronics Specialists Conf., 1999, pp. 111-116.

T. F. Wu, Y. J. Wu, and Y. C. Liu, "Development of Converters for Improving Effciency and Achieving Both Power Factor Correction and Fast Output Regulation," in IEEE Applied Power Electronics Conf., 1999, pp. 958-964.

(Continued)

*Primary Examiner*—Shawn Riley
(74) *Attorney, Agent, or Firm*—Buchanan Ingersoll PC

(57) ABSTRACT

A power converter for operating with an alternate current power source, including a storage capacitive means and a transformer, said storage capacitive means being adapted for power factor correction, said transformer including an input for connecting to an alternating current power source and at least a first output and a second output respectively for connecting to said storage capacitive means and the load, said transformer including input windings, first output windings and second output windings which are respectively connected to said input, said first and second outputs wherein said transformer and said storage capacitive means being adapted that the voltage across said storage capacitive means being related to the voltage of said first output of said transformer.

10 Claims, 5 Drawing Sheets

OTHER PUBLICATIONS

J. Sebastian, P. J. Villegas, F. Nuno, and M. M. Hernando, "High-Efficiency and Wide-Bandwidth Performance Obtainable from a Two-Input Buck Converter," in IEEE Trans. Power Electron., vol. 13, No. 4, pp. 706-717, Jul. 1998.

C. K. Tse, M. H. L. Chow, and M. K. H. Cheung, "Reduced Redundant Power Processing ($R^2P^2$) PFC Voltage Regulators: Circuit Synthesis and Control,"0 in IEEE Power Electronics Specialists Conf., 2000, pp. 825-830.

D. D. C. Lu, K. W. Cheng, and Y. S. Lee, "A Novel Single-Phase Power-Factor-Corrected Voltage Regulator,"0 in IEEE Power Electronics Speciallists Conf., 2001, pp. 936-941.

J. Y. Lee, and M. J. Youn, "A Single-Stage Power-Factor Correction Converter with Simple Link Voltage Suppressing Circuit (LVSC),"0 in IEEE Trans. Ind. Electron., vol. 48, pp. 572-584, Jun. 2001.

O. Garcia, P. Alou, J. A. Oliver, J.A. Cobos, J. Uceda, and S. Ollero, "AC/DC Converters with Tight Output Voltage Regulation and with a Single Control Loop," in IEEE Power Electronics Conf., 1999, pp. 1098-1104.

A. Lazaro, A. Barrado, J. Pleite, R. Vazquez, and E. Ollas, "New Family of Single-Stage PFC Converters with Series Inductance Interval,"0 in IEEE Power Electronics Specialists Conf., 2002, pp. 1357-1362.

* cited by examiner (a) $P_o$=30W

POWER CONVERTER WITH POWER FACTOR ADJUSTING MEANS

FIELD OF THE INVENTION

The present invention relates to power converters with means, devices and apparatus for adjusting power factor. More specifically, although of course not solely limited thereto, the present invention relates to a single stage power factor corrected power converter (SSPFC).

BACKGROUND OF THE INVENTION

Power converters, for example, AC/DC converters, are usually equipped with power factor correction means or circuits. An intermediate storage capacitor is typically used to provide the necessary power factor correction or adjustment. However, the intermediate storage capacitor for power factor correction is usually subject to a high voltage stress as the voltage of the intermediate storage capacitor is usually left uncontrolled and can vary widely with respect to the line voltage and the load current. Consequently, the storage capacitor voltage can be substantially higher than the peak line voltage.

For example, while the ordinary line input voltage ranges from 90 to 265 Vrms, the voltage across the intermediate storage capacitor can vary between 140V to 2500V. If the DC/DC regulator stage operates in the continuous conduction mode ("CCM") and at a decreasing load, the storage capacitor voltage can go up even higher due to power imbalance between the input and output.

As a result, a bulkier storage capacitor with a higher voltage rating as well as other high-voltage-rating devices (such as power switches and diodes) which inevitably lead to an increase of the size and the total costs will have to be used.

Furthermore, as single-stage power-factor-corrected converters (SSPFC) aiming at reducing the cost and simplifying the power stages and control of the converter have been developed by integrating a power factor correction (PFC) circuit with a DC/DC regulator circuit and is becoming more useful, there is therefore an urging need to devise improved power factor corrected power converters so that the demand on the voltage rating of the intermediate storage capacitor can be lessened so that a less bulky storage capacitor with a lower voltage rating can be used.

In order to alleviate the above problems, various schemes and methodologies such as the use of variable frequency control, bus voltage feedback control and series-charging-parallel-discharging techniques have been reported. In addition, it has been suggested to alleviate the problems by inserting a direct power transfer path to the input stage of a converter to raise conversion efficiency and to lower the voltage stress on the storage capacitor. However, the large storage capacitor voltage swing due to line voltage variation remains a largely unresolved problem. In particular, the voltage across the storage capacitor of the known power-factor-corrected power converters always exceed the peak line input voltage due to the presence of a boost converter in such topologies which inevitably steps up the voltage across the storage capacitor. Garcia et al in "*AC/DC Converters with tight output voltage regulation and with a single control loop,*" in *IEEE Power Electronics Specialists Conf.,* 1999, pp. 1098–1104, and Lazaro et al, in "*New family of single-stage PFC converters with series inductance interval,*" in *IEEE Power Electronics Specialists Conf,* 200, pp. 1357–1362 attempted to reduce the storage capacitor voltage below the peak line voltage by using flyback-buckboost and flyback-boost converters respectively. However, such converters require two switches and are less attractive for low-power applications.

OBJECT OF THE INVENTION

Hence, it is an object of the present invention to provide power-factor-corrected converters with a less stringent demand on the voltage rating of the intermediate storage capacitor so that a less bulky storage capacitor can be utilized for power factor correction. At a minimum, it is an object of the present invention to provide the public with a useful choice of power-factor-corrected converters and circuit topologies and schemes for PFC converters.

SUMMARY OF THE INVENTION

According to the present invention, there is provided A power converter for operating with an alternate current power source, including a storage capacitive means and a transformer, said storage capacitive means being adapted for power factor correction, said transformer including an input for connecting to an alternating current power source and at least a first output and a second output respectively for connecting to said storage capacitive means and the load, said transformer including input windings, first output windings and second output windings which are respectively connected to said input, said first and second outputs wherein said transformer and said storage capacitive means being adapted that the voltage across said storage capacitive means being related to the voltage of said first output of said transformer.

According to a second aspect of the present invention, there is provided a single-stage power-factor-corrected power converter including a dual-output flyback transformer, an intermediate storage capacitor, an electronic switching means and an output transformer for coupling power to a load, said intermediate storage capacitor being adapted for power factor correction, said flyback transformer including an input for connecting to an alternate current power source and at least a first output and a second output respectively for connecting to said storage capacitive means and the load, said transformer including input windings, first output windings and second output windings respectively connected to said input and said first and second outputs, said first output windings of said flyback transformer and said intermediate storage capacitor being both connected to said electronic switching means, said second output windings of said flyback transfer being connected to the output of said power connection.

Preferably, the windings in association with said input and first output terminals of said transformer being adapted that the voltage across said storage capacitive means does not exceed the voltage appearing at said input terminal during normal operation.

Preferably, said input windings and said first output windings being in series connection with a common switching means, said storage capacitive means be charged and discharged when said switching means being turned on and off.

Preferably, an electronic switching means being connected simultaneously to first and second circuit loops which respectively contain the input windings of said input terminal and first output windings of said first output terminal of said transformer, wherein, during normal operation when said switching means being in the "on" state, said storage capacitive means being charged up and, when said switching means being in the "off" state, the energy stored in said capacitive storage means being transferred to a load.

Preferably, during normal operation, the voltage across said storage capacitive means being tied to the output voltage of said second output of said transformer.

Preferably, the voltage of said storage capacitive means being generally proportional to the output voltage of said second output of said transformer.

Preferably, the ratio between the voltage across said capacitive means and the output voltage of said second output of said transformer being proportional to the turns ratio between the number of windings.

Preferably, said transformer being configured as a flyback transformer.

BRIEF DESCRIPTION OF THE PREFERRED EMBODIMENTS

Preferred embodiments of the present invention will be explained in further detail below by way of examples and with reference to the accompanying drawings, in which:

FIG. 1 shows a schematic circuit diagram of single-switch flyback power-factor-corrected AC/DC power converter (SSPFC) as an example of a preferred embodiment of the present invention, FIG. 2 shows an operation and timing diagram of the SSPFC of FIG. 1 in a line cycle, FIGS. 3*a* and 3*b* show the more salient switching waveforms of T1 primary and secondary currents within a switching period $T_S$ at different modes, FIGS. 4*a* and 4*b* respectively show the measured storage capacitor voltage $V_B$ (upper), line input voltage (middle) and current (lower) at 90 Vrms and different output power (time base+5 ms/div).

DETAILED DESCRIPTION OF THE PREFERRED EMBODIMENTS

Figure 1:
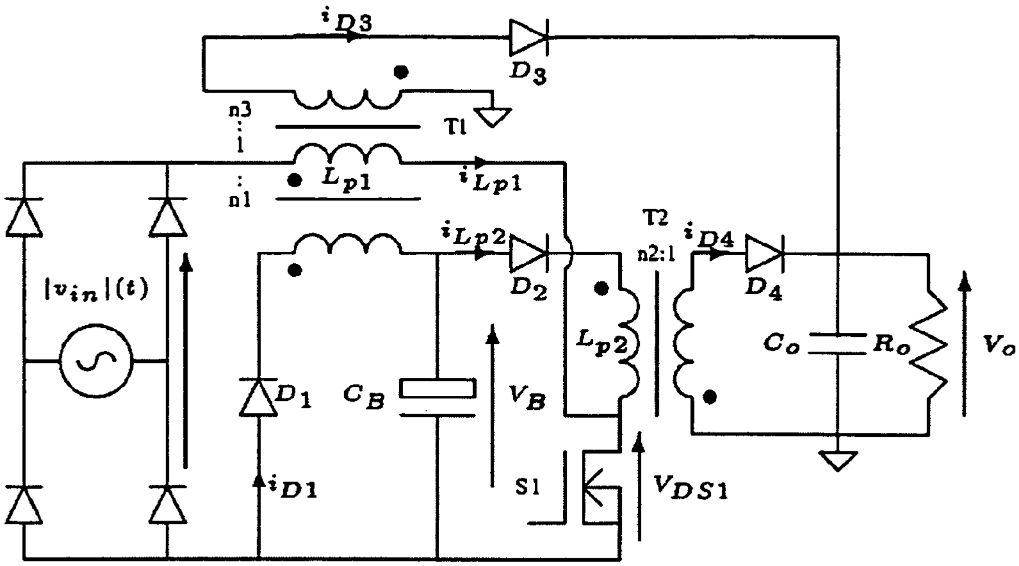

In the description below, a preferred embodiment of a power-factor-corrected power converter will be explained in more detail by reference to the circuitry of a single-stage power-factor-corrected power converter (SSPFC). The power-factor-corrected power converter includes a dual-output transformer, which is configured as a dual-output flyback transformer T1, a storage capacitive means which is an intermediate storage capacitor $C_B$ in the present example, an electronic switching means S1 which is a MOSFET switch in the present example and an isolating output transformer T2. The dual-output flyback transformer T1 includes an input, a first output and a second output which are respectively connected to input windings, first output windings and second output windings respectively with the respective winding ratios 1:n1:n3.

The transformer T1 is configured in a flyback topology so that the transformer can simultaneously serve as a filter, a power transferring transformer and a storage element which at the same time provides circuit isolation between the input and the output. This flyback topology is in contrast to the forward topology in which the transformer only serves to transfer power and to provide isolation between the input and the outputs. In the forward transformer configuration, an additional inductor is required to implement the filter and storage functions. Furthermore, the flyback transformer topology has the further benefit of accepting a wider range of input voltage because it can either step up or step down the input voltage while the forward transformer topology is generally for stepping down input voltage. In this example, flyback transformer is used as a preferred example.

The intermediate storage capacitor $C_B$ is used primarily for buffering the power imbalance between the alternating current (AC) input power and the output power. That is, when the AC input power is less than the output power, the storage capacitor means, namely, the intermediate storage capacitor $C_B$ in the present example, will deliver the extra energy required to maintain a substantially constant output power. On the other hand, the intermediate storage capacitor $C_B$ will store excess energy when the input power exceeds the output power. In addition, the intermediate storage capacitor $C_B$ is also adapted to provide a sufficient hold-up time for the power supply to maintain a short period of power output when the input is cut off momentarily.

Hence, the transformer and the intermediate storage capacitor co-operate as the primary components to achieve power factor correction as well as controlled output voltage regulation as to be described below.

An electronically controllable switching device, such as, for example, a MOSFET, an IGBT or other appropriate switching devices is included to enable the alternative power charging on the intermediate storage capacitor and power output to the load. In this specific configuration, the two switching terminals of the switching device S1 are connected in series to the input winding and the first output of the dual-output flyback transformer. As can be seen from the schematic circuit diagram of FIG. 1, the switching means S1 is included in a loop containing the first output winding of the dual-output transformer, a diode D2, windings $L_{P2}$ of the output transformer and another diode D1. In addition, it also forms part of the loop containing the intermediate storage capacitor $C_B$, the diode D2 and the winding $L_{P2}$. Furthermore, the switching device also forms part of the loop containing the input windings of the flyback transformer T1 and the power source.

As can be noted from the circuit diagram, the input of the input windings of the flyback transformer T1 is for connection to an alternating power source and the output of the input windings $L_{P1}$ is connected to a node intermediate between the windings $L_{P2}$ of the output transformer and the switching means S1. Hence, it would be appreciated from the circuit diagram and the description above that a single or common switching device is simultaneously connected in series with the input windings and the first output windings of the flyback transformer, thereby alleviating the need of two separate switches as is required by the known flyback-buckboost or flyback-boost converters.

The dual-output flyback transformer T1 includes a second output which is connected with the second output windings. This second output windings are connected to the output or a load via a diode D3. The connection between the second output winding of the flyback transformer and the output provides a feedback path so that the output voltage $V_0$ is fed back to the first output windings by the ratio N3/N1 in a perfectly coupled transformer, although a more detailed analysis of the coupling will be described below. By this feedback arrangement via the second output windings of the flyback transformer, the voltage across the intermediate storage capacitive means or the intermediate storage capacitor $C_B$ will be controlled with reference to the magnitude of the output voltage, $V_0$ and the turns ratio N3/N1.

The output transformer T2 is provided for coupling power from the primary circuit (including the flyback transformer and the intermediate power capacitor) to the load. Of course, the output voltage $V_0$ can be adjusted by varying the turns ratio N2 in the output transformer without loss of generality.

Furthermore, the output transformer T2 also provides the necessary isolation to enable paths that can be selectively isolated by means of electronic switching for power transfer to the load and, alternatively, for power storage.

Detailed operation of the present preferred embodiment of a SSPFC will be explained below.

Operation

Referring to the schematic circuit diagram of FIG. 1, the dual-output flyback transformer T1 is connected to the line to shape the input current (it works in the Discontinuous Conduction Mode DCM for PFC function), to deliver energy to the intermediate storage capacitor $C_B$, to provide a direct power transfer path to output for the converter and, more importantly, to control the voltage of $C_B$. $C_B$ delivers power through the flyback transformer T2, which operates in either DCM or CCM.

Figure 3A:
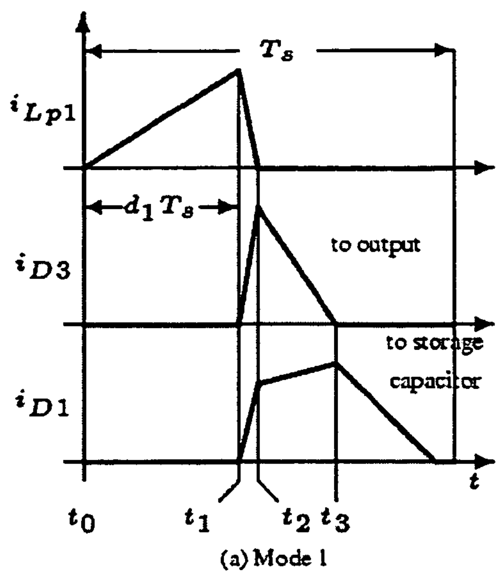
Figure 3B:
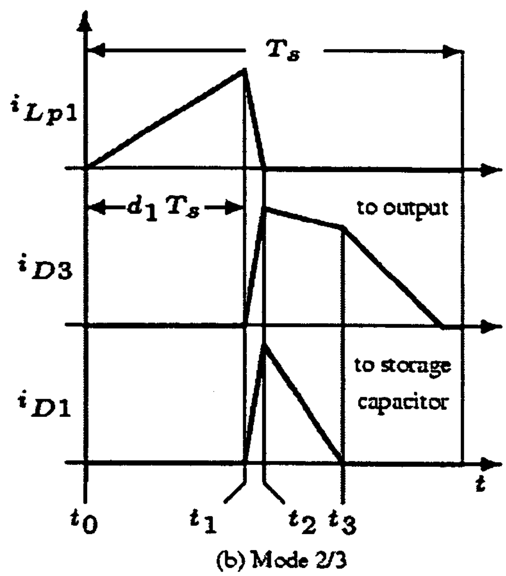

The operation of the flyback SSPFC is described generally below. When the power switch S1 is turned on, $L_{p1}$ and $L_{p2}$ are charged up linearly by the rectified input voltage $V_{in}$ and the voltage across the storage capacitor $V_B$ respectively. Diodes $D_1$, $D_3$ and $D_4$ are reverse biased at this instant and are therefore not conducting. The output capacitor $C_o$ sustains the output voltage $V_o$. After the period $d_1T_s$ has lapsed, the switch S1 is turned off as shown in FIG. 3, the diode $D_4$ is forward biased and the energy stored in T2 will be coupled to the load. Meanwhile, the energy stored in T1 is transferred to $C_B$ and $R_o$ through $D_1$ and $D_3$ respectively. Before S1 is turned on again to begin the next switching cycle, all the energy stored in T1 would have normally been completely transferred to the load and $C_B$ (thus, $i_{D1}$ and $i_{D3}$ will fall to zero). If T2 runs in CCM, $V_o$ is maintained by the energy delivered from T2 through D4. On the other hand, if T2 operates in DCM, no current will flow in T2 before S1 is turned on. $V_o$ is then sustained by $C_o$. To repeat the operation cycle, S1 is switched on again.

Figure 2:
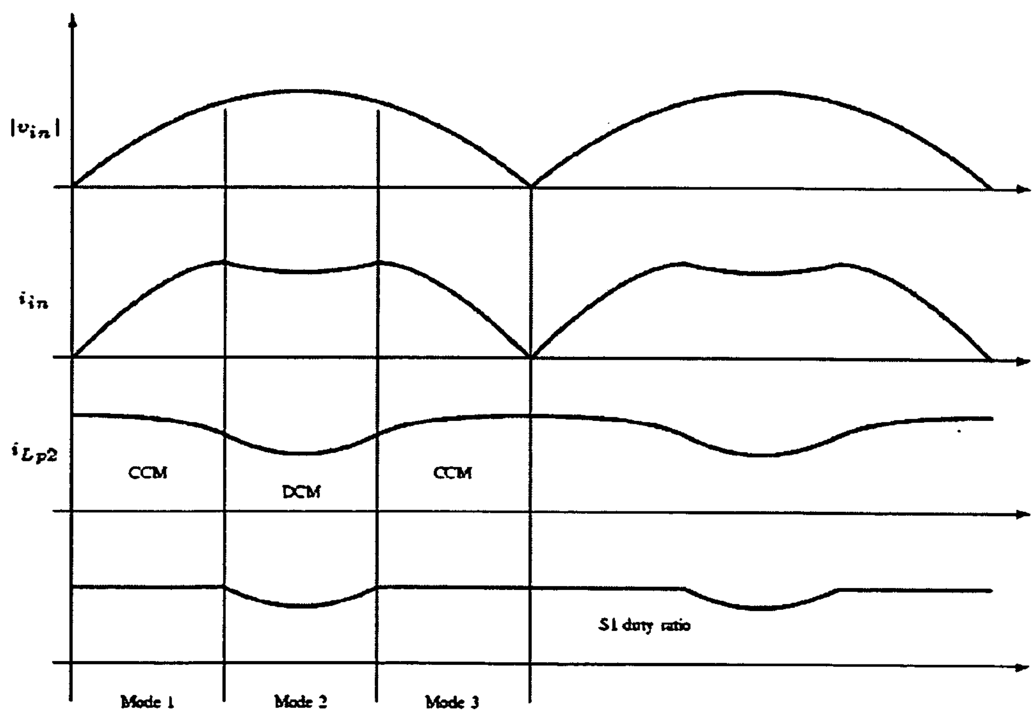

When $|V_{in}|$ sis going through a half line cycle, the transformer T2 enters into different conduction modes, as shown in FIG. 2. Although transformer T1 works in DCM, the inevitable leakage inductance in T1 will alter the downslopes and shapes of the secondary currents. Typically, there are three modes of operation and they are described below with reference to FIG. 2.

Mode 1: during this mode, T2 runs in CCM. As the input power is lower than the output power, T2 handles most of the output power. The major portion of stored energy in T1 will be coupled to $C_B$ through D1. $i_{D1}$ has a generally trapezoidal waveform while $i_{D3}$ has a generally triangular waveform, as shown in FIG. 3(*a*). In addition, because the duty ratio of S1 is substantially constant within this interval, more input power as well as more output power will be handled by T1 as input voltage increases. On one hand, this pushes T2 towards DCM as T1 provides more output current. On the other hand, the current in D1 becomes smaller.

Mode 2: In this mode, T2 runs in DCM and T1 handles most of the output power. $i_{D3}$ now has a trapezoidal shape and $i_{D1}$ has a triangular shape, as shown in FIG. 3(*b*). When T2 runs in CCM, it automatically corrects the current difference in $D_3$ and $D_4$ by shifting the level of CCM. But when both transformers T1 and T2 work in DCM, the duty ratio has to be decreased to maintain a constant output power, as the line voltage increases.

Mode 3: As input voltage reduces, T2 again handles the major part of the output power as the input power becomes smaller. The duty ratio remains constant as in Mode 1. The only difference is that the distribution of the secondary currents of T1 are maintained substantially the same as that in Mode 2.

It should be noted that $V_o$ is substantially free from low frequency components of the line voltage at both operation modes (DCM and CCM) of T2. When T2 runs in CCM, the duty ratio of S1 is constant due to fast self-adjustment of the transformer current. When T2 runs in DCM (Mode 2in FIG. 2), the transformer current adjustment disappears but the fast feedback loop of $V_o$ gives a valley-shape duty ratio of S1 which maintains the output constant.

Analysis of Storage Capacitor Voltage

For ideal coupling transformer (i.e. in the absence of leakage inductance), the storage capacitor voltage $V_B$ will be merely controlled by the turns ratio of transformer T1 as the output voltage $V_o$ is tightly regulated and it is given by equation (1) below:

$$V_B = \frac{n_1}{n_3}V_o \tag{1}$$

However, in practice, the wiring inductance and the leakage inductance of transformer degrade the cross regulation of the converter. Equation (1) is no longer valid. By inspecting the current waveforms in Mode 1 and using input-output power balance between T1, T2 and $V_o$, the steady state expression of the storage capacitor voltage during this mode can be found.

$$V_B = \frac{n_1}{n_3}\frac{K_2 + \sqrt{K_2^2 - 4K_1K_3}}{2K_1}V_o \text{ where} \tag{2}$$

$$K_1 = \frac{1}{16}[16\pi n_3 M_1^2 k_c(2-k)^2/d_1^2 - 8n_1M_1(2-k)(3-2k) + \pi n_3(1-k)(2-k)(3-k)] \tag{3}$$

$$K_2 = \frac{1}{16}[16\pi n_3 M_1^2 k_c(2-k)/d_1^2 - 8M_1(3-k)^2 + \pi n_3(1-k)(3-k)] \tag{4}$$

$$K_3 = \frac{1}{2}[2\pi n_3 M_1^2 k_c/d_1^2 - M_1 k] \tag{5}$$

In the above equations, M1 is the ratio of output voltage to peak input voltage, k is the coupling coefficient of T1 and $k_c$=Lp1/($R_oT_s$). Equation (2) holds provided that T2 operates in CCM throughout the entire line cycle. Otherwise, the equation of steady state $V_B$ over a half line cycle will involve different modes of operation and complex calculation. However, from equation (2) it is enough for one to predict that $V_B$ will be controlled not only by the turns ratio and $V_{O1}$ by the peak input voltage. When the peak input voltage increases, $V_B$ will also increase.

Analysis of Input Current

The average input current $<i_{in}>$ of the proposed converter within one switching period equals the average primary current of T1$<i_{in}>L_{p1}$ and is given by $$\langle i_{in}\rangle = \frac{d_1^2 Ts}{2L_{p1}}|V_{in}(t)| \quad (6)$$

This resembles the input current of a normal flyback converter serving as a power factor correction circuit. Hence, the proposed flyback SSPFC inherits unity factor property provided that T2 is working in CCM throughout the line cycle so that the duty ratio $d_1$ can be kept constant. It is observed from FIG. 2 that T2 may enter DCM in Mode 2, resulting in distorted input current as the third current harmonic component increases (and higher odd harmonics but of smaller quantity). The longer the duration of Mode 2, the poorer the power factor will be. In fact when the output power becomes light, T2 has larger tendency to enter DCM.

Experimental Results

Figure 4A:
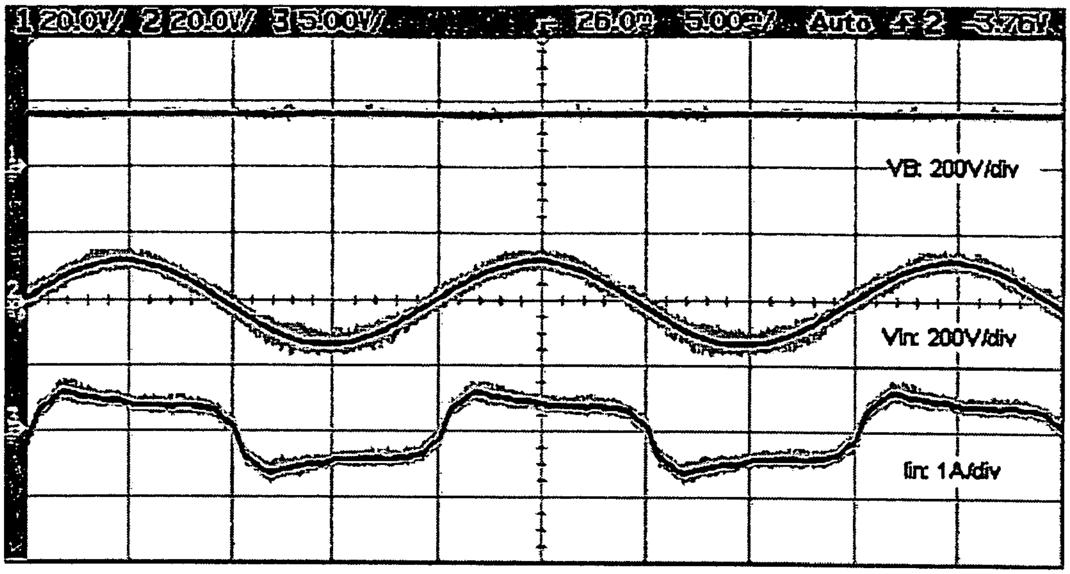
Figure 4B:
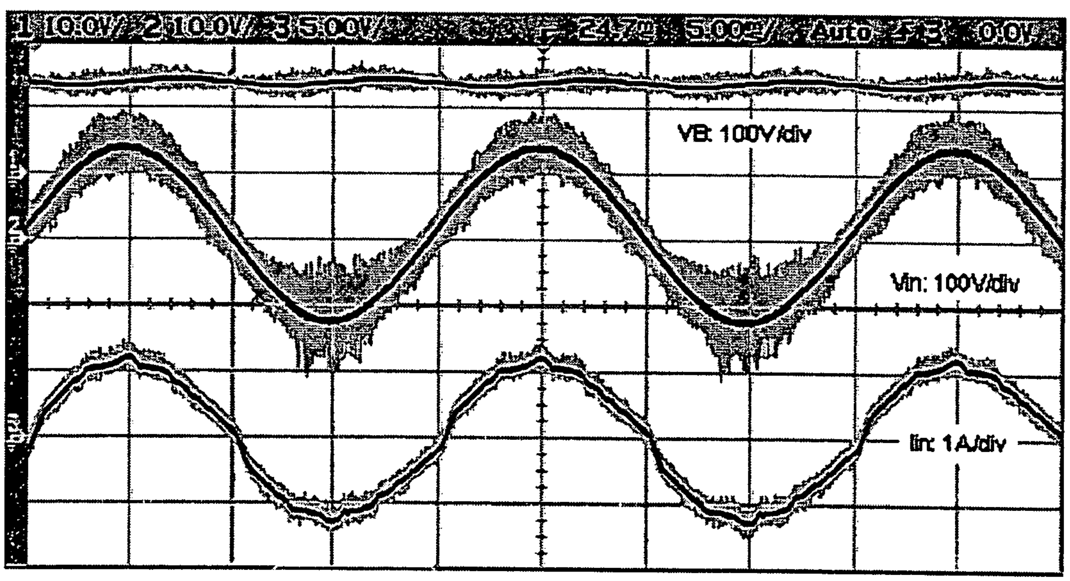
Figure 5:
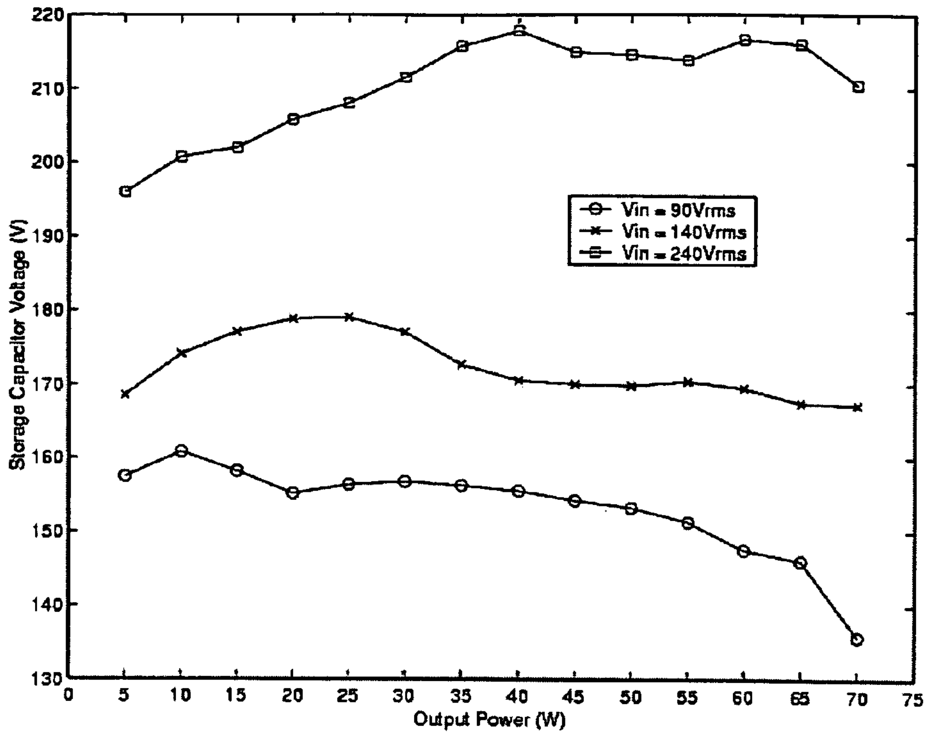
FIG. 5 is a graph showing the measured storage capacitor voltage $V_B$ versus output power at different $V_{in}$.
Figure 6:
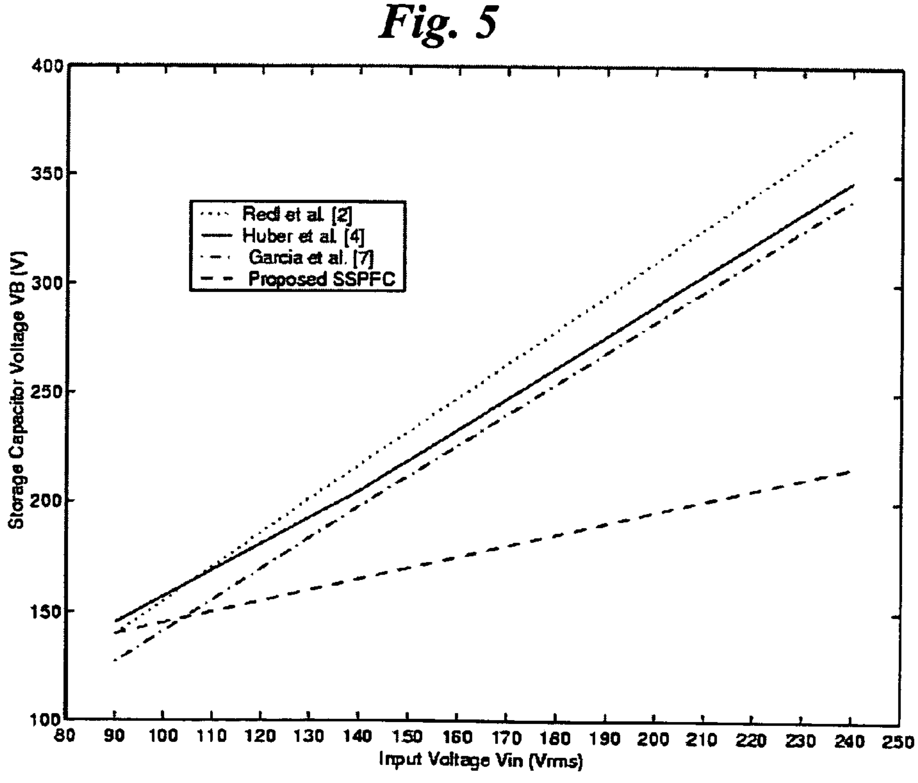
FIG. 6 is a graph showing the comparison of $V_B$ against $V_{in}$ on different converter topologies.
Figure 7:
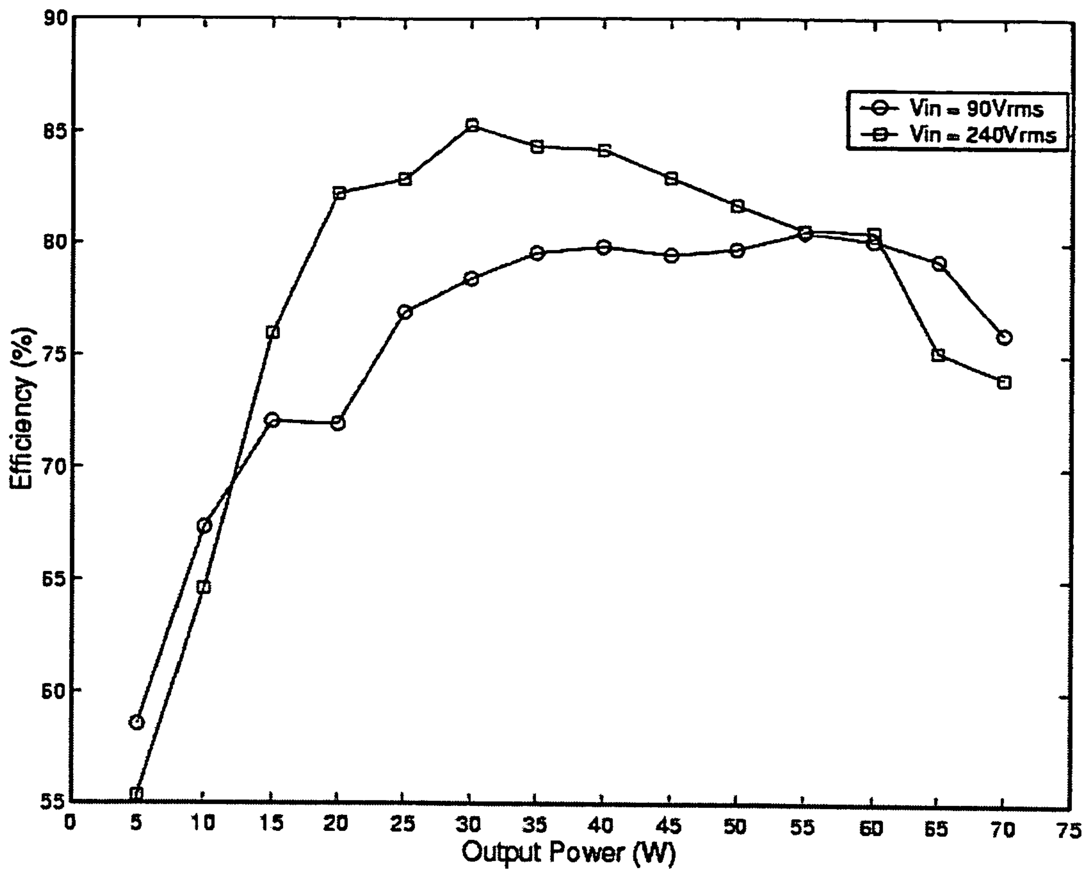
FIG. 7 is a graph showing Efficiency vs Output Power at different input voltages.

In order to verify the operation of the proposed SSPFC shown in FIG. 1, a 28 Vdc-70 W hardware prototype with input voltage range 90–240 Vrms and 100 kHz switching frequency has been implemented and tested. The circuit parameters used for the experiment are $L_{p1}$=70 μH, $n_1$=0.31, $n_3$=1.54; $L_{p2}$= 900 μH, $n_2$=3.3; $C_B$=200 μF; $C_o$=1000 μF; S1: MTW14N50E, $D_1$: MUR 4100E, $D_2$: MUR460, $D_3$ and $D_4$:MUR860. FIG. 4 shows the waveforms of the storage capacitor voltage, the input line voltage and the line current at 90 Vrms for a light load (30 W) and at full load (70 W). The measured power factor is 0.946 at 30 W and 0.997 at 70 W. The storage capacitor voltage $V_B$ throughout the load range at different line voltages is recorded in FIG. 5. In theory, $V_B$ equals (1.54/0.31)*28=139V according to equation (1). In practice, due to inevitable wiring and leakage inductances, $V_B$ increases as input voltage increases, as have been predicted in (2). However, the increment of $V_B$ of the proposed single-switch SSPFC (around 50–75V for 90–240 Vrms input) is much smaller than that of the existing single-stage topologies (at least 200V difference). It can also be seen that the variation of $V_B$ is small even for large changes of output power (or load current). Furthermore, it is shown that $V_B$ can be loosely regulated at a voltage lower than the peak input voltage at high line (240 Vrms in this case), so that a smaller voltage-rating capacitor can be used (e.g. 250V). When comparing with existing converter topologies, FIG. 6 shows that the proposed SSPFC has the lowest $V_H$ at high line voltage. FIG. 7 shows that the measured efficiency of the SSPFC at different input voltages is around 80% at output power above 20 W.

While the present invention has been explained by reference to the preferred embodiments described above, it will be appreciated that the embodiments are illustrated as examples to assist understanding of the present invention and are not meant to be restrictive on the scope and spirit of the present invention. The scope of this invention should be determined from the general principles and spirit of the invention as described above. In particular, variations or modifications which are obvious or trivial to persons skilled in the art, as well as improvements made on the basis of the present invention, should be considered as falling within the scope and boundary of the present invention.

Furthermore, while the present invention has been explained by reference to a single stage power factor correction power converter, it should be appreciated that the invention can apply, whether with or without modification, to other multiple stage power converters without loss of generality.

The invention claimed is:

1. A power converter for use with an alternate current power source and a load, comprising a storage capacitive means for power factor correction, a first transformer and an output transformer, the first transformer comprising first windings, output windings and feedback windings, the second transformer comprising input windings and output windings, the first windings of the first transformer being connected intermediate the alternate power source and one end of the input windings of the second transformer, the output windings of the first transformer being connected to the input windings of the second transformer at an end which is not connected with the first windings of the first transformer, the feedback windings being connected to the output of the second transformer whereby output voltage of the second transformer is fed back to the first transformer, and wherein the storage capacitive means is connected intermediate the output windings of the first transformer and the input windings of the second transformer so that the voltage across the storage capacitive means is dependent on the output voltage of the second transformer.

2. A power converter according to claim 1, wherein the voltage across the storage capacitive means relates to the output voltage of the second transformer by a constant factor.

3. A power converter according to claim 2, wherein the constant factor is a ratio between the turns in the output and feedback windings of the first transformer.

4. A power converter according to claim 1, wherein the voltage across the storage capacitive means is below the peak voltage of the alternate current power source.

5. A power converter according to claim 1, wherein the first transformer is a dual-output flyback transformer and the second transformer is a flyback transformer.

6. A power converter according to claim 5, wherein the first windings of the first transformer, the input windings of the second transformer and the output windings of the first transformer are connected in series, the polarity of the first windings of the first transformer is opposite to that of the input windings of the second transformer and that of the output windings of the first transformer.

7. A power converter according to claim 6, further including a chopping switch connected in series with the input windings of the second transformer in a loop comprising the output windings of the first transformer and the input windings of the second transformer and at a node at which the first windings of the first transformer are connected with the input windings of the second transformer.

8. A power converter according to claim 7, further including a diode connected intermediate the output windings of the first transformer and the input windings of the second transformer, the diode being forwardly connected with respect to the chopping switch, and wherein the storage capacitive means is connected across the series connection of the diode, the input windings of the second transformer and the chopping switch.

9. A power converter according to claim 8, further including another diode connected in series intermediate the output windings of the first transformer and the chopping switch, the output windings of the first transformer being intermediate the storage capacitive means and said another diode.

10. A power converter according to claim 6, wherein polarity of the feedback windings of the first transformer is opposite to that of the first windings of the first transformer and that of the output windings of the first transformer.

* * * * *